United States Patent
Finkelstein et al.

(10) Patent No.: US 9,355,191 B1
(45) Date of Patent: May 31, 2016

(54) IDENTIFICATION OF QUERY COMPLETIONS WHICH CHANGE USERS' ORIGINAL SEARCH INTENT

(71) Applicant: Google Inc., Mountain View, CA (US)

(72) Inventors: Lev Finkelstein, Haifa (IL); Sivan Eiger, Tel Aviv (IL)

(73) Assignee: Google Inc., Mountain View, CA (US)

( * ) Notice: Subject to any disclaimer, the term of this patent is extended or adjusted under 35 U.S.C. 154(b) by 636 days.

(21) Appl. No.: 13/748,929

(22) Filed: Jan. 24, 2013

Related U.S. Application Data (60) Provisional application No. 61/590,003, filed on Jan. 24, 2012.

(51) Int. Cl.
*G06F 17/30* (2006.01)

(52) U.S. Cl.
CPC .................. *G06F 17/3097* (2013.01)

(58) Field of Classification Search
CPC .................. G06F 17/00; G06F 17/30
See application file for complete search history.

(56) References Cited

U.S. PATENT DOCUMENTS

| | | | | |
|---|---|---|---|---|
| 6,006,225 | A * | 12/1999 | Bowman | G06F 17/30395 |
| 6,564,213 | B1 * | 5/2003 | Ortega | G06F 17/3064 |
| 7,487,145 | B1 * | 2/2009 | Gibbs | G06F 17/3064 |
| 7,499,940 | B1 * | 3/2009 | Gibbs | G06F 17/30887 |
| 7,552,112 | B2 * | 6/2009 | Jhala | G06F 17/3064 |
| 7,756,855 | B2 | 7/2010 | Ismalon | |
| 7,836,044 | B2 * | 11/2010 | Kamvar | G06F 17/30646 707/713 |
| 8,930,338 | B2 * | 1/2015 | Velipasaoglu | G06F 17/30 707/706 |
| 2005/0283468 | A1 * | 12/2005 | Kamvar | G06F 17/30646 |
| 2008/0071740 | A1 * | 3/2008 | Jhala | G06F 17/3064 |
| 2009/0228439 | A1 * | 9/2009 | Manolescu | G06F 17/30864 |
| 2010/0005087 | A1 * | 1/2010 | Basco | G06F 17/30867 707/E17.017 |
| 2012/0296927 | A1 * | 11/2012 | Velipasaoglu | G06F 17/30867 707/768 |
| 2013/0086509 | A1 * | 4/2013 | Satyanarayana | G06F 17/3064 715/781 |

FOREIGN PATENT DOCUMENTS

WO 2006055120 7/2006

OTHER PUBLICATIONS

Fan, Ju, Hao Wu, Guoliang Li, and Lizhu Zhou. "Suggesting topic-based query terms as you type." In Web Conference (APWEB), 2010 12th International Asia-Pacific, pp. 61-67. IEEE, 2010.*

Wu, Hao, and Lizhu Zhou. "Form-Based Instant Search and Query Autocompletion on Relational Data." In Web-Age Information Management, pp. 139-151. Springer Berlin Heidelberg, 2012.*

(Continued)

*Primary Examiner* — Farhan Syed
(74) *Attorney, Agent, or Firm* — Middleton Reutlinger (57) ABSTRACT

Technology described herein identifies and demotes query completions which divert users from their original search intent. The identified query completions may represent informational requests that are amusing diversions for some users, but which are not relevant to the actual information of interest for many users. For example, the identified query completions may represent information requests that some users may find humorous or entertaining, but which are not relevant to actual information of interest for many other users. The identification of these query completions may allow alternative query completions to be provided that can more likely assist users in finding the information they actually seek.

14 Claims, 4 Drawing Sheets

(56) References Cited

OTHER PUBLICATIONS

Xu, Yabo, Ke Wang, Benyu Zhang, and Zheng Chen. "Privacy-enhancing personalized web search." In Proceedings of the 16th international conference on World Wide Web, pp. 591-600. ACM, 2007.*

Peng, Fuchun, Nawaaz Ahmed, Xin Li, and Yumao Lu. "Context sensitive stemming for web search." In Proceedings of the 30th annual international ACM SIGIR conference on Research and development in information retrieval, pp. 639-646. ACM, 2007.*

Fujita, Sumio, Georges Dupret, and Ricardo Baeza-Yates. "Learning to rank query recommendations by semantic similarities." arXiv preprint arXiv:1204.2712 (2012).*

Umemoto, Kazutoshi, Takehiro Yamamoto, Satoshi Nakamura, and Katsumi Tanaka. "Search intent estimation from user's eye movements for supporting information seeking." In Proceedings of the International Working Conference on Advanced Visual Interfaces, pp. 349-356. ACM, 2012.*

\* cited by examiner

IDENTIFICATION OF QUERY COMPLETIONS WHICH CHANGE USERS' ORIGINAL SEARCH INTENT

CROSS-REFERENCE TO RELATED APPLICATIONS

This Application claims the benefit of U.S. Provisional Application No. 61/590,003, filed Jan. 24, 2012, which is incorporated by reference herein in its entirety.

BACKGROUND

The present disclosure relates to query processing.

Information retrieval systems, such as Internet search engines, help users by retrieving information, such as web pages, images, text documents and multimedia content, in response to search queries. Search engines use a variety of signals to determine the relevance of the retrieved content to a user's search query.

Formulating a search query that accurately represents the user's informational need can be challenging. Search engines may suggest queries to the user, to help the user. Some search engines provide suggested query completions to the user as the user is typing a query. The user can then select one of the suggested query completions for submission as a search query to the search engine, so that search results can be obtained.

SUMMARY

In some implementations, a method is described that includes identifying a query completion that potentially changes users' original search intent. The method further includes testing an impact of withholding the identified query completion on a frequency of submission of search queries matching the identified query completion. The method further includes classifying the identified query completion as search intent changing based on a decrease in the frequency of submission of search queries matching the identified query completion, the decrease occurring during the testing the impact of withholding the identified query completion.

This method and other implementations of the technology disclosed can each optionally include one or more of the following features.

Identifying the query completion can include calculating a completion origination score for the query completion. The completion origination score can be based on a ratio between a frequency of submission of the identified query completion as a search query upon being provided as a suggested query completion, and a total frequency of submission of the query completion as a search query. A determination can then be made that the completion origination score for the query completion satisfies a threshold.

Testing the impact of withholding the identified query completion can include preventing the identified query completion from being provided as a suggested completion in response to at least one corresponding partial query submitted by at least some users during the testing. The identified query completion may be prevented from being provided as a suggested completion in response to the at least one corresponding partial query submitted by a predetermined percentage of users during the testing.

The method may further include utilizing a database of query completions having corresponding popularity scores, where the query completions include the identified query completion. A popularity score for a given query completion in the database can be based at least in part on a frequency of submission of the given query completion as a search query by prior users. The popularity scores can then be used to select query completions in the database as suggested completions for partial queries submitted by users. Upon classifying the identified query completion as search intent changing, the popularity score of the identified query completion can be demoted.

Classifying the identified query completion as intent changing can be based on a frequency of submission of search queries entered by users during the testing which match the identified query completion. The classification can be further based on a frequency of submission of search queries entered by users during a time interval preceding the testing which match the identified query completion.

Classifying the identified query completion as intent changing may be based on a frequency of submission of search queries matching the identified query completion entered by users when the identified query completion has been withheld during the testing.

The search queries matching the identified query completion may be those search queries which are identical to the identified query completion.

Classifying the identified query completion as search intent changing can include estimating a confidence interval based on a decrease in the frequency of submission of search queries matching the identified query completion during the test. A determination can then be made that the confidence interval satisfies a threshold. In response to the determination, the identified query completion can be classified as intent changing.

The identified query completion may be a popular query which has been submitted more than a threshold number of times.

The method may further include demoting the identified query completion in response to identifying the query completion as search intent changing.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular implementations of the subject matter described herein can identify and/or demote query completions which divert users away from their original search intent. These identified query completions may represent informational requests that are amusing diversions for some users, but which are not relevant to the actual information of interest for many users. The identification of these query completions allows other query completions to be provided that can more likely assist users in finding the information they actually seek.

Particular aspects of one or more implementations of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIG. 2 is a flow chart illustrating an example process for identifying and demoting a query completion that changes users' original search intent.

DETAILED DESCRIPTION

Implementations of technology described herein identifies and demotes query completions which divert users away from their original search intent. These identified query completions may represent informational requests that are amusing diversions for some users, but which are not relevant to the actual information of interest for many users. For example, the identified query completions may represent information requests that some users may find humorous or entertaining. The identification of these query completions allows additional query completions to be provided that can more likely assist users in finding the information they actually seek.

Figure 1:
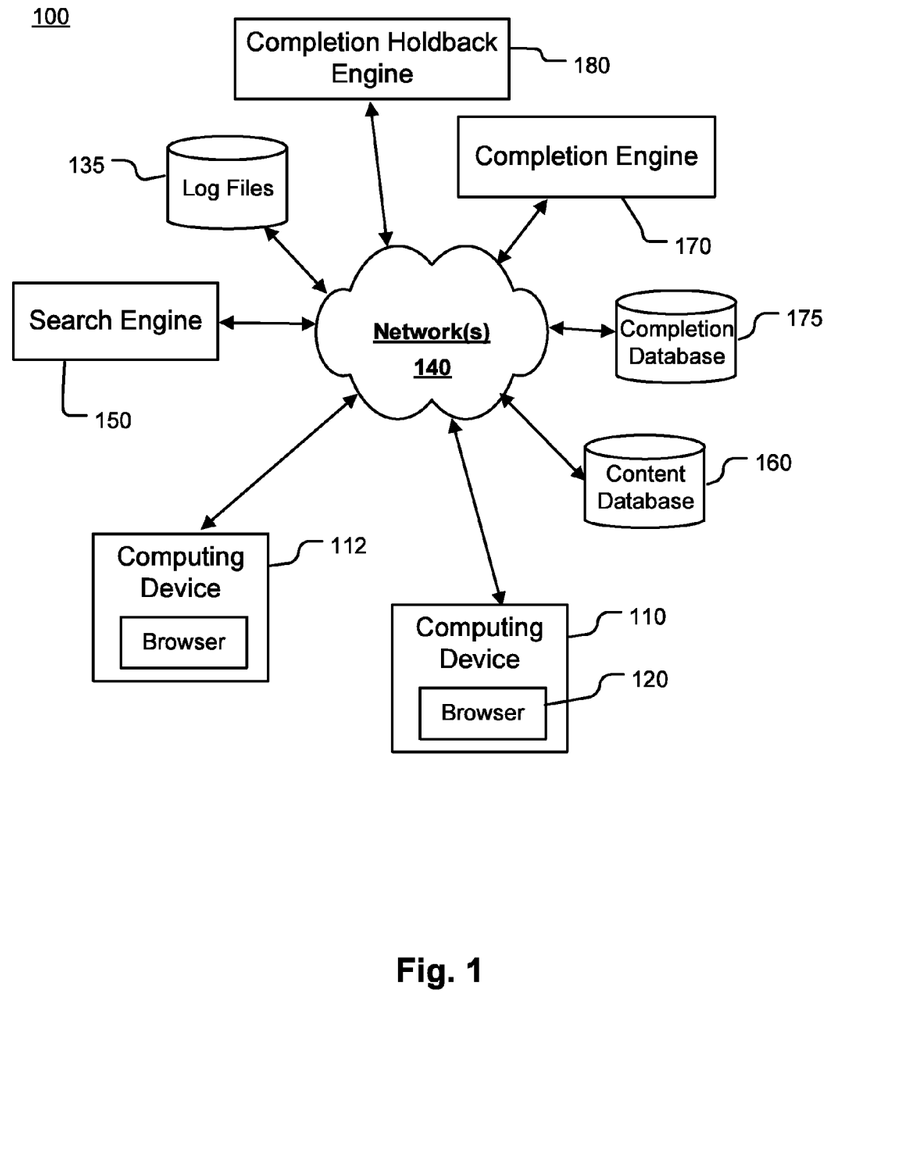
FIG. 1 illustrates a block diagram of an example environment in which identifying query completions that change users' original search intent can be used.

FIG. 1 illustrates a block diagram of an example environment 100 in which identifying query completions that change users' original search intent can be used. The environment 100 includes client computing devices 110, 112 and a search engine 150. The environment 100 also includes a communication network (or networks) 140 that allows for communication between various components of the environment 100.

In one implementation, the network 140 includes the Internet. The network can also utilize dedicated or private communication links that are not necessarily part of the Internet. In one implementation, the network 140 uses standard communications technologies, protocols, and/or inter-process communication technologies.

During operation, users interact with the search engine 150 through the client computing devices 110, 112. The client computing devices 110, 112 and the search engine 150 each include memory for storage of data and software applications, a processor for accessing data and executing applications, and components that facilitate communication over the network 140.

The client computing devices 110, 112 execute applications, such as web browsers (e.g. web browser 120 executing on client computing device 110), that allow users to enter complete search queries and submit them to the search engine 150. The search engine 150 receives the complete search queries from the client computing devices 110, 112, and executes the queries against a content database 160 of available documents such as web pages, images, text documents, and multimedia content. The search engine 150 identifies content in the content database 160 which matches the queries, and responds by generating search results which are transmitted to the client computing devices 110, 112 in a form that can be presented to the users. For example, in response to a query from the client computing device 110, the search engine 150 may transmit a search results web page to be displayed in the web browser 120 executing on the client computing device 110.

The applications executing on the client computing devices 110, 112 also provide partial queries being formulated by users, before the users have indicated completion of the queries. The applications may be for example a web browser, a toolbar running in a web browser, or a search client running on the client computing devices 110, 112. In some implementations, the applications provide each character of a query as it is typed or otherwise entered by the users. In other implementations, the applications provide multiple characters at a time following a pause between character entries.

A "partial query" is a query formulated by a user prior to an indication by the user that the query is complete. In some implementations a user may indicate completion of the query by entering a carriage return or equivalent character. As another example, the user may indicate completion of the query by selecting a search button in a user interface presented to the user during entry of the query. As yet another example, the user may additionally and/or alternatively indicate completion of the query by saying a command in a speech interface or pausing more than a predetermined period of time.

The search engine 150 and/or a completion engine 170 (described below) may maintain log files 135 of user search session data associated with past queries submitted by prior users. Any maintained log files 135 may be anonymous logs not traceable to a particular user. The log files 135 may be collectively stored on one or more computers and/or storage devices. The user search session data may include information pertaining to one or more aspects of past queries. For example, in some implementations the user search session data may include information indicating whether a certain occurrence of a given search query in the log files 135 was submitted as a query without being selected as a query completion and/or if it was submitted upon being selected as a query completion (e.g., as described below).

The applications executing on the client computing devices 110, 112 provide the partial queries to a completion engine 170. The completion engine 170 includes memory for storage of data and software applications, a processor for accessing data and executing applications, and components that facilitate communication over the communication network 140.

The completion engine 170 maintains a completion database 175 of query completions. These query completions represent queries that users may want to submit in addition to, or instead of, the partial queries actually being typed.

The completion engine 170 retrieves prior queries in the log files 135 for inclusion in the completion database 175 as query completions. The techniques for determining which of the prior queries in the log files 135 to include in the completion database 175 can vary from implementation to implementation. In some implementations, the completion engine 170 selects a given prior query for inclusion in the completion database 175 if it is a popular query that has been submitted more than a threshold number of times. Alternatively, other techniques may be used to determine which prior queries to include in the completion database 175.

The completion engine 170 also calculates popularity scores for the query completions in the completion database 175. The popularity score for a given query completion may be based at least in part on the frequency of submission of the given query completion as a search query by prior users. In some implementations, the popularity score is calculated based on the number of times the given query completion appears as a search query in the log files 135. For example, in some implementations, the popularity score is calculated by counting the number of times the given query completion appears as a search query in the log files 135.

As described in more detail below, query completions in the completion database 175 are periodically analyzed by a completion holdback engine 180 using the techniques described herein. In particular, the completion holdback engine 180 identifies query completions which tend to divert users from their original search intent. These identified query completions may represent informational requests that are amusing diversions for some users, but which are not relevant to the actual information of interest for many users. The completion holdback engine 180 demotes at least one score associated with the identified query completions, so that other query completions in the completion database 175 are more likely to be provided to subsequent users. For example, in implementations in which a higher popularity score represents a higher likelihood of being provided as a query completion, the completion holdback engine 180 may reduce the popularity scores of the identified query completions.

In response to a partial query, the completion engine 170 may also calculate completion scores of the query completions in the completion database 175 for the partial query. The completion scores represent an extent to which query completions in the completion database 175 are suitable query completions for the partial query. The completion scores may be calculated using conventional and/or other techniques.

In some implementations, the completion scores are calculated using prefix based matching. In such a case, the completion score for a given query completion may be assigned the highest value if the given query completion includes the partial query as a prefix. The prefix is one or more terms occurring at the beginning of a query. If the given query completion does not include the partial query as a prefix, its completion score may be assigned the lowest value. Other techniques may also or alternatively be used to calculate the completion scores.

The completion engine 170 then calculates ranking scores for the query completions in the completion database 175 using the completion scores and/or the popularity scores. The ranking score for a given query completion can be calculated as a function of its completion score and its popularity score. For example, the ranking score of a given query completion may be a weighted average of its completion score and its popularity score.

The completion engine 170 then selects one or more of the query completions in the completion database 175 for the partial query based at least in part on the ranking scores. For example, a predetermined number of query completions having the highest ranking scores may be selected. Other criteria may also or alternatively be used. For example, the ranking scores may be compared to a threshold, and the query completions that satisfy the threshold may be selected.

The completion engine 170 then provides the selected query completions for display on the computing device that was used to submit the partial query. The selected query completions represent queries that a user may want to submit instead of, or in addition to, the partial query actually being typed. The selected query completions may for example be displayed within a cascaded drop down menu of the search field of an application, such as web browser, executing on the computing device as the user is typing the query. In some implementations, search results for a query completion within the cascaded drop down menu are also displayed as the user is typing the query.

The user can then select one of the displayed query completions for submission as a search query to the search engine 150, so that search results can be obtained. Upon selection of a displayed query completion by the user, the search engine 150 may for example transmit a search results web page to be displayed in the application, such as web browser, executing on the computing device used by the user. Alternatively, if the user is not satisfied with the displayed query completions, the user may enter one or more additional query characters, and obtain additional query completions.

The completion holdback engine 180 uses the techniques described herein to periodically identify and demote query completions in the completion database 175 that tend to change users' original search intent. The term "periodically" is used herein to indicate that the analysis is performed from time-to-time or occasionally. The term "periodically" is not intended to require that the analysis be performed at fixed intervals of time. The completion holdback engine 180 can be implemented in hardware, firmware or software running on hardware. The completion holdback engine 180 is described in more detail below with reference to FIGS. 2-4.

By demoting the query completions in the completion database 175 that change users' original search intent, other query completions can be provided that can more likely assist users in finding the information they actually seek.

FIG. 2 is a flow chart illustrating an example process for identifying and demoting a query completion that changes users' original search intent. Other implementations may perform the steps in different orders and/or perform different or additional steps than the ones illustrated in FIG. 2. For convenience, FIG. 2 will be described with reference to a system of one or more computers than performs the process. The system can be, for example, the completion holdback engine 180 in conjunction with the completion engine 170 described above with reference to FIG. 1.

At step 200, the system maintains a database of query completions having corresponding popularity scores. The popularity scores may for example be calculated using the techniques described above.

At step 210, the system identifies a query completion that potentially changes users' original search intent. The techniques for identifying a query completion that potentially changes users' original search intent can vary from implementation to implementation. In some implementations, the system identifies such a query completion based on its calculated completion origination score as described in more detail below with reference to FIG. 3. Alternatively, other techniques may be used to identify a query completion that potentially changes users' original search intent.

At step 220, the system tests the impact of withholding the identified query completion on the frequency of submission of search queries matching the identified query completion. The impact of withholding the identified query completion is tested by preventing the identified query completion from being provided as a suggested query completion in response to partial queries submitted by at least some users during the test.

The techniques for determining which users to withhold the identified query completion from being provided to during the test can vary from implementation to implementation. These users may for example be determined based on a combination of a hash of a unique identifier, such as a cookie, associated with each user, and a hash of the identified query completion. In such a case, if the combined hash for a given user/identified query completion pair satisfies a certain criteria that holds for a predefined percentage of user/query completion pairs, the given user is then prevented from being provided with the identified query completion during the test. For example, a remainder between 0 and 99 upon dividing the combined hash by 1000 corresponds to 10% of users. In doing so, different query completions can be withheld from different users, so that the same user is not prevented from being provided with a large number of withheld query completions. The criteria for determining whether an identified query completion is prevented from being provided may for example be calculated based on the frequency of submission of the identified query completion as a search query. For example, in some implementations the hash for a given user/identified query completion pair may be tested for satisfaction against certain criteria that holds for a predefined percentage of user/query completion pairs.

In some implementations, the identified query completion is prevented from being provided to a predetermined percentage of users that would otherwise have received it in response to their partial queries.

At step 230, the system classifies the identified query completion as 'search intent changing' or not, based on the frequency of submission of search queries matching the identified query completion during the test.

The techniques for classifying the identified query completion can vary from implementation to implementation. In some implementations the classification may be performed by comparing a decrease in the frequency of submission during the test to a threshold. If the decrease satisfies the threshold, the identified query may be classified as search intent changing. Otherwise, it may be classified as not search intent changing. For example, if the decrease exceeds the threshold, the identified query may be classified as search intent changing. The threshold may for example be based on the frequency of submission of search queries matching the identified query completion during a time interval preceding the test.

In some implementations, the classification may be performed using a classifier which is provided with the decrease in the frequency of submission during the test as an input signal. The classifier may be, for example, a support vector machine which has been trained using a training set of withheld query completions. Alternatively, other classifiers may be used, such as a decision tree or a neural network.

The classifier may output a confidence interval that is a measure of the likelihood that the identified query completion is search intent changing. The identified query completion can be classified as search intent changing if the confidence interval is above a threshold. If the estimated confidence interval is below the threshold, the identified query completion can be classified as not search intent changing.

In some implementations, rather than providing the classifier with a single input signal that indicates the decrease in the frequency of submission during the test, multiple input signals are provided to the classifier. For example, the classifier may be provided with an input signal based on a frequency of submission of the identified query completion as a search query entered by users without selecting a displayed query completion during the time interval preceding the test. The classifier may also be provided with an input signal based on a frequency of submission of the identified query completion as a selected query completion during the time interval preceding the test. As another example, the classifier may be provided with an input signal based on a frequency of submission of the identified query completion as a query without being selected as a query completion during the test. The classifier may also be provided with an input signal based on a frequency of submission of the identified query completion as a selected query completion during the test. As yet another example, the classifier may be provided with an input signal based on the length of the identified query completion. The classifier may also be provided with an input signal based on the length of one or more partial query for which the identified query completion was provided to users.

The techniques for determining the decrease in the frequency of submission can vary from implementation to implementation. In some implementations, the decrease in the frequency of submission can be determined based on the difference or ratio between the number of times the identified query completion was submitted by a first set of users which have been withheld the identified query completion during the test, to the number of times the identified query completion was submitted by a second set of users which have not been withheld the identified query completion during the test.

Additional and/or alternative techniques may be used to determine the decrease. For example, the decrease in the frequency of submission can be determined based on the difference or ratio between the number of times search queries matching the identified query completion have been written to the log files 135 since the beginning of the test, and the number of times those written search queries matching the identified query completion were entered by users which have been withheld the identified query completion during the test.

The decrease in the frequency of submission may alternatively be determined based on the difference or ratio between the number of times search queries matching the identified query completion have been written to the log files 135 since the beginning of the test, and the number of times search queries matching the identified query completion are written to the log files 135 during a time interval preceding the test. The time interval preceding the test may for example be the same length of time since the test began. Alternatively, these lengths of time may be different.

The relative size of the decrease in the frequency of submission during the test indicates a likelihood that the identified query completion does not represent the original information interest of many users. That is, an appreciable decrease in the frequency of submission during the test that is sufficient to classify the identified query completion as search intent changing, indicates that a considerable proportion of users will not submit the identified query completion as a search query, unless it is provided as a suggested query completion. This in turn indicates that the query completion likely changes users' original search intent upon being provided, rather than representing their original informational need. For example, a query completion that represents an information request that some users may find humorous or entertaining, such as "how to become a vampire", may be selected when provided as a suggested query completion, but not entered as a complete search query by many users upon being withheld during the test. In such a case, the frequency of submission of the query completion will decrease appreciably during the test, which indicates that the query completion is quite different from the original search intent of many users.

In contrast, a relatively small decrease in the frequency of submission during the test that is not sufficient to classify the identified query completion as search intent changing, indicates that, when it is not provided as a suggested query completion, a number of users will still enter the identified query completion as a complete search query. This in turn indicates that the identified query completion represents an information request that may be of original interest to many users. In such a case, the identified query completion can be a meaningful query completion which assists users in finding the actual information they seek. For example, a relatively long query completion such as "driving directions from san francisco to san jose" may have a relatively small decrease in the frequency of submission during the test, because the original interest of many users is to search for such driving directions. In such a case, a significant number of users will enter the query "driving directions from san francisco to san jose" when it is not provided as a suggested query completion. As a result, such a query completion represents an information request that assists users in finding the original information they seek, rather than diverting them from their original information need.

The techniques for determining whether a search query matches the identified query completion can vary from implementation to implementation. In some implementations, the search queries matching the identified query completion are those that are identical to the identified query completion.

If at step 230, the identified query completion is classified as not search intent changing, the process skips step 240 and ends at step 250.

If at step 230, the identified query completion is classified as search intent changing, the process continues to step 240. As step 240, the identified query completion is demoted. For example, in some implementations a score associated with the identified query completion may be demoted. For example, in implementations in which a higher popularity score represents a higher likelihood of being provided as a suggested query completion, the system reduces the popularity scores of the identified query completion. In doing so, the identified query completion is less likely to be provided as a suggested query completion to subsequent users. In some implementations the identified query completion may be demoted by a predetermined amount and/or percentage. For example, in some implementations the popularity score may be demoted by a predetermined amount. In some implementations the demotion of the query completion may be based on additional and/or alternative factors. For example, in some implementations the degree of the demotion of the popularity score may be based on the degree of decrease in the frequency of submission of search queries matching the identified query completion during the test as optionally determined at step 230. For example, a larger decrease in the frequency of submission of search queries matching the identified query completion during the test may result in a larger demotion of the identified query completion as compared to a smaller decrease in the frequency of submission of search queries.

Figure 3:
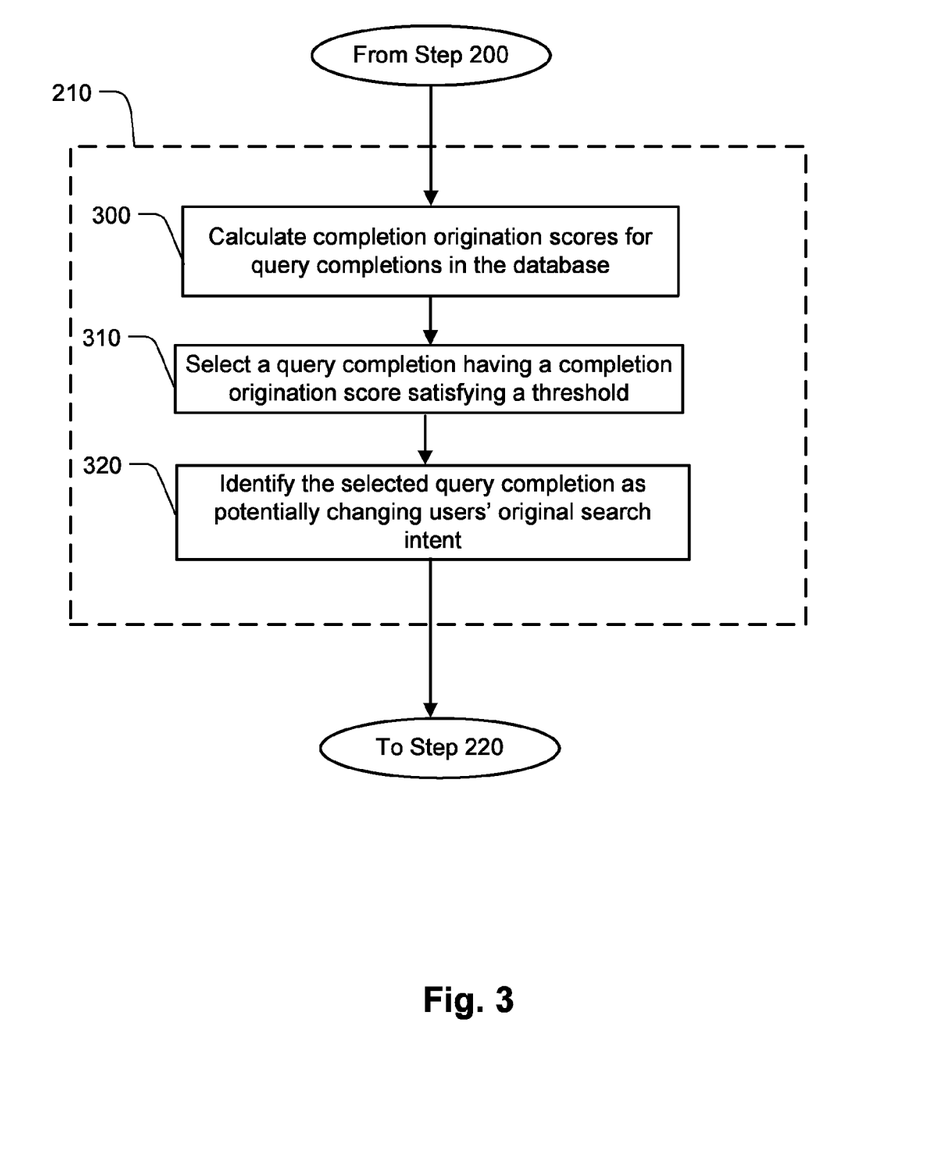
FIG. 3 is a flow chart illustrating an example process for identifying a query completion that changes users' original search intent.

FIG. 3 is a flow chart illustrating an example process for step 210 in FIG. 2 of identifying a query completion that changes users' original search intent. Other implementations may perform the steps in different orders and/or perform different or additional steps than the ones illustrated in FIG. 3. For convenience, FIG. 3 will be described with reference to a system of one or more computers that performs the process. The system can be, for example, the completion holdback engine 180 described above with reference to FIG. 1.

At step 300, the system calculates completion origination scores for query completions in the database. The completion origination score for a given query completion may be based on a completion origination ratio. In some implementations the completion origination ratio is based on a ratio of the frequency of submission of the given query completion as a search query upon being provided as a suggestion query completion, to a total frequency of submission of the query completion as a search query. In some implementations the completion origination ratio is based on a ratio of the total frequency of submission of the query completion as a search query to the frequency of submission of the given query completion as a search query upon being provided as a suggestion query completion. In some implementations, the completion origination score is equal to the completion origination ratio. Alternatively, the completion origination score can be calculated as a function of the completion origination ratio. The function that is used can vary from implementation to implementation. The function may be, for example, a monotonic function of the completion origination ratio.

The frequency of submission of the given query completion upon being provided as a suggestion query completion can be determined by counting the number of times the given query completion appears in the log files 135 as being a selected query completion submitted by users. The total frequency of submission of the query completion can be determined by counting the number of times the given query completion appears in the log files 135, without regard to whether it was submitted as a query entered by a user without being selected as a query completion, or as a query completion selected by a user.

At step 310, the system selects a query completion having a completion origination score satisfying a threshold. For example, in implementations where the completion origination score is based on a completion origination ratio of the frequency of submission of the given query completion as a search query upon being provided as a suggestion query completion, to a total frequency of submission of the query completion as a search query, the system may select a query completion having a completion origination score that exceeds a threshold. Also, for example, in implementations where the completion origination score is based on a completion origination ratio of the total frequency of submission of the query completion as a search query to the frequency of submission of the given query completion as a search query upon being provided as a suggestion query completion, the system may select a query completion having a completion origination score that does not exceed a threshold.

A completion origination score that satisfies the threshold signifies that an appreciable proportion of the users that submitted the query completion as a search query, did so by selecting it as a suggested query completion. That is, a completion origination score that satisfies the threshold indicates that the query completion was submitted so infrequently when not selected as a query completion that it potentially does not represent the original search intent of many users. This in turn indicates that the query completion potentially changes users' original search intent upon being provided, rather than representing their original informational need. It should be noted that a selected query completion having a completion origination score that satisfies the threshold is not necessarily search intent changing. For example, a long query completion such as "driving directions from san francisco to san jose" may be frequently selected upon being provided as a suggested query completion, because it is more convenient for users to select it than to type out the entire query.

In implementations in which the completion origination score is equal to the completion origination ratio, and the origination ratio is based on a ratio of the frequency of submission of the given query completion as a search query upon being provided as a suggestion query completion, to a total frequency of submission of the query completion as a search query, the threshold may be for example 0.80 or 0.85. Alternatively, the value of the threshold may be different.

At step 320, the system identifies the selected query completion as potentially changing users' original search intent. The process then continues to step 220.

Figure 4:
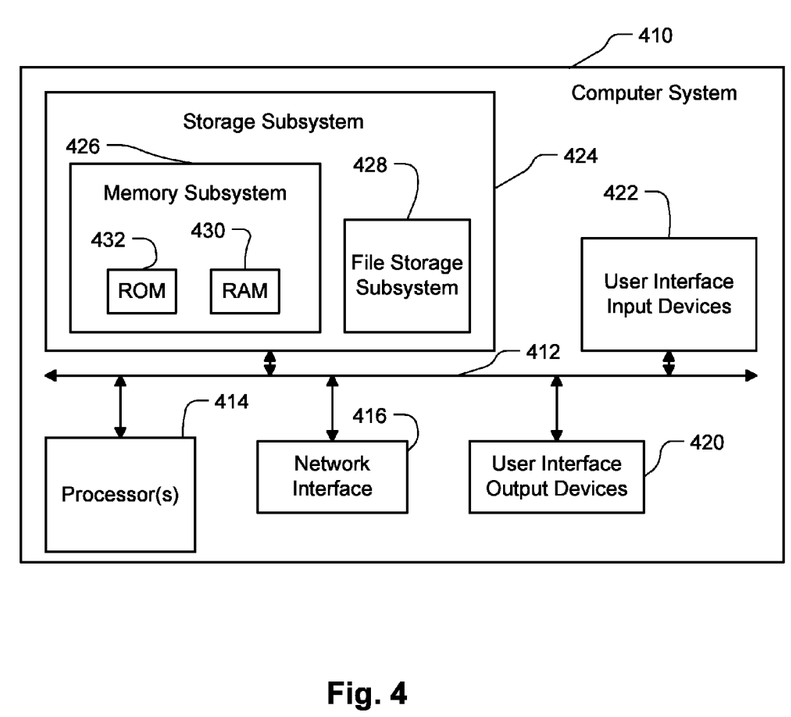
FIG. 4 is a block diagram of an example computer system.

FIG. 4 is a block diagram of an example computer system. Computer system 410 typically includes at least one processor 414 which communicates with a number of peripheral devices via bus subsystem 412. These peripheral devices may include a storage subsystem 424, comprising for example memory devices and a file storage subsystem, user interface input devices 422, user interface output devices 420, and a network interface subsystem 416. The input and output devices allow user interaction with computer system 410. Network interface subsystem 416 provides an interface to outside networks, including an interface to communication network 140, and is coupled via communication network 140 to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 410 or onto communication network 140.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein, including the logic to identify and demote query completions which divert users from their original search intent according to the processes described herein. These software modules are generally executed by processor 414 alone or in combination with other processors.

Memory 426 used in the storage subsystem can include a number of memories including a main random access memory (RAM) 430 for storage of instructions and data during program execution and a read only memory (ROM) 432 in which fixed instructions are stored. A file storage subsystem 428 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 428 in the storage subsystem 424, or in other machines accessible by the processor.

Bus subsystem 412 provides a mechanism for letting the various components and subsystems of computer system 410 communicate with each other as intended. Although bus subsystem 412 is shown schematically as a single bus, alternative embodiments of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating the preferred embodiments. Many other configurations of computer system 410 are possible having more or fewer components than the computer system depicted in FIG. 4.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for identifying and demoting query completions which divert users from their original search intent, systems including logic and resources to identify and demote query completions which divert users from their original search intent, systems that take advantage of computer-assisted methods for identifies and demotes query completions which divert users from their original search intent, media impressed with logic to identify and demote query completions which divert users from their original search intent, data streams impressed with logic to identify and demote query completions which divert users from their original search intent, or computer-accessible services that carry out computer-assisted methods for identifying and demoting query completions which divert users from their original search intent. It is contemplated that modifications and combinations will readily occur to those skilled in the art, which modifications and combinations will be within the scope of the following claims.

We claim as follows:

1. A computer-implemented method performed by one or more computers, the method comprising:
    calculating, by one or more of the computers, a completion origination score for a query completion based on a frequency of client computing device submission of the query completion as a search query upon being provided as a suggested query completion and a total frequency of client computing device submission of the query completion as a search query;
    identifying, by one or more of the computers based on the completion origination score, the query completion as potentially changing users' original search intent;
    testing, by one or more of the computers, an impact of withholding the identified query completion on a frequency of client computing device submission of search queries matching the identified query completion, wherein the testing is in response to identifying the query completion as potentially changing the users' original search intent, and wherein the testing comprises preventing the identified query completion from being provided as a suggested completion in response to at least one corresponding partial query submitted by at least some client computing devices of users during the testing; and
    classifying, by one or more of the computers, the identified query completion as search intent changing based on a decrease in the frequency of client computing device submission of search queries matching the identified query completion, the decrease being in a frequency of client computing device submission of search queries entered by users during the testing which match the identified query completion relative to a frequency of client computing device submission of search queries matching the identified query completion during a time interval outside of the testing;
    in response to classifying the identified query completion as search intent changing, demoting, by one or more of the computers, a popularity score of the identified query completion, the popularity score being assigned to the identified query completion in a database and being used to select the identified query completion as a suggested completion for partial queries submitted by users.

2. The method of claim 1, wherein the identified query completion is prevented from being provided as a suggested completion in response to the at least one corresponding partial query submitted by a predetermined percentage of users during the testing.

3. The method of claim 1, wherein classifying the identified query completion as search intent changing is based on a frequency of client computing device submission of search queries matching the identified query completion entered by users when the identified query completion has been withheld during the testing.

4. The method of claim 1, wherein the search queries matching the identified query completion are identical to the identified query completion.

5. The method of claim 1, wherein classifying the identified query completion as search intent changing comprises:
- estimating a confidence interval based on the decrease in the frequency of client computing device submission of search queries matching the identified query completion during the testing;
- determining that the confidence interval satisfies a threshold; and
- in response to the determination, classifying the identified query completion as search intent changing.

6. The method of claim 1, wherein the identified query completion is a popular query which been submitted more than a threshold number of times.

7. A non-transitory computer readable storage medium storing computer instructions executable by a processor to perform a method comprising:
- calculating a completion origination score for a query completion based on a frequency of client computing device submission of the query completion as a search query upon being provided as a suggested query completion and a total frequency of client computing device submission of the query completion as a search query;
- identifying, based on the completion origination score, the query completion as potentially changing users' original search intent;
- testing an impact of withholding the identified query completion on a frequency of client computing device submission of search queries matching the identified query completion, wherein the testing is in response to identifying the query completion as potentially changing the users' original search intent, and wherein the testing comprises preventing the identified query completion from being provided as a suggested completion in response to at least one corresponding partial query submitted by at least some client computing devices of users during the testing; and
- classifying the identified query completion as search intent changing based on a decrease in the frequency of client computing device submission of search queries matching the identified query completion, the decrease being in a frequency of client computing device submission of search queries entered by users during the testing which match the identified query completion relative to a frequency of client computing device submission of search queries matching the identified query completion during a time interval outside of the testing;
- in response to classifying the identified query completion as search intent changing, demoting a popularity score of the identified query completion, the popularity score being assigned to the identified query completion in a database and being used to select the identified query completion as a suggested completion for partial queries submitted by users.

8. The non-transitory computer readable storage medium of claim 7, wherein the identified query completion is prevented from being provided as a suggested completion in response to the at least one corresponding partial query submitted by a predetermined percentage of users during the testing.

9. The non-transitory computer readable storage medium of claim 7, wherein classifying the identified query completion as search intent changing is based on a frequency of client computing device submission of search queries matching the identified query completion entered by users when the identified query completion has been withheld during the testing.

10. The non-transitory computer readable storage medium of claim 7, wherein classifying the identified query completion as search intent changing comprises:
- estimating a confidence interval based on the decrease in the frequency of client computing device submission of search queries matching the identified query completion during the testing;
- determining that the confidence interval satisfies a threshold; and
- in response to the determination, classifying the identified query completion as search intent changing.

11. A system including memory and one or more processors operable to execute instructions, stored in the memory, comprising instructions to:
- calculate a completion origination score for a query completion based on a frequency of client computing device submission of the query completion as a search query upon being provided as a suggested query completion and a total frequency of client computing device submission of the query completion as a search query;
- identify, based on the completion origination score, the query completion as potentially changing users' original search intent;
- test an impact of withholding the identified query completion on a frequency of client computing device submission of search queries matching the identified query completion, wherein the testing is in response to identifying the query completion as potentially changing the users' original search intent, and wherein the testing comprises preventing the identified query completion from being provided as a suggested completion in response to at least one corresponding partial query submitted by at least some client computing devices of users during the testing; and
- classify the identified query completion as search intent changing based on a decrease in the frequency of client computing device submission of search queries matching the identified query completion, the decrease being in a frequency of client computing device submission of search queries entered by users during the testing which match the identified query completion relative to a frequency of client computing device submission of search queries matching the identified query completion during a time interval outside of the testing;
- demote, in response to classifying the identified query completion as search intent changing, a popularity score of the identified query completion, the popularity score being assigned to the identified query completion in a database and being used to select the identified query completion as a suggested completion for partial queries submitted by users.

12. The system of claim 11, wherein the identified query completion is prevented from being provided as a suggested completion in response to the at least one corresponding partial query submitted by a predetermined percentage of users during the testing.

13. The system of claim 11, wherein the instructions to classify the identified query completion as search intent changing is based on a frequency of client computing device submission of search queries matching the identified query completion entered by users when the identified query completion has been withheld during the testing.

14. The system of claim 11, wherein the instructions to classify the identified query completion as search intent changing comprises instructions to:

estimate a confidence interval based on a decrease in the frequency of client computing device submission of search queries matching the identified query completion during the testing;
determine that the confidence interval satisfies a threshold; and
in response to the determination, classify the identified query completion as search intent changing.

* * * * *